(12) United States Patent
Boyce

(10) Patent No.: US 7,457,999 B2
(45) Date of Patent: Nov. 25, 2008

(54) DEBUG PORT SYSTEM FOR CONTROL AND OBSERVATION

(75) Inventor: Douglas G. Boyce, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 11/168,906

(22) Filed: Jun. 28, 2005

(65) Prior Publication Data

US 2006/0294424 A1 Dec. 28, 2006

(51) Int. Cl.
*G01R 31/28* (2006.01)
*G06F 11/00* (2006.01)

(52) U.S. Cl. .............................. 714/726; 714/30; 714/39

(58) Field of Classification Search ................ 714/30, 714/37, 39, 736, 712, 715, 819, 724, 725, 714/726, 733, 734; 716/4
See application file for complete search history.

(56) References Cited

U.S. PATENT DOCUMENTS

| | | | |
|---|---|---|---|
| 5,828,824 A * | 10/1998 | Swoboda ..................... 714/25 |
| 5,937,154 A * | 8/1999 | Tegethoff ..................... 714/30 |
| 6,314,530 B1 * | 11/2001 | Mann ........................... 714/38 |
| 6,502,146 B1 * | 12/2002 | Rasmussen et al. ......... 710/100 |
| 6,594,717 B2 * | 7/2003 | Rasmussen et al. ......... 710/100 |
| 6,738,929 B2 * | 5/2004 | Swoboda et al. ............. 714/28 |
| 2003/0065829 A1 * | 4/2003 | Rasmussen et al. ........... 710/1 |
| 2007/0011517 A1 * | 1/2007 | Boyce ....................... 714/724 |

* cited by examiner

*Primary Examiner*—Phung M Chung
(74) *Attorney, Agent, or Firm*—Buckley, Maschoff & Talwalkar LLC

(57) ABSTRACT

Some embodiments provide a device under test comprising a processing core to support execution debug signals, a debug ring to receive and to transmit the execution debug signals from and to the device under test, a first debug port to receive and transmit the execution debug signals from and to the debug ring, and a second debug port to receive data from observation signal lines of the device under test. The first debug port may transmit execution debug signals to define an event to detect within the device under test, to receive execution debug signals indicating occurrence of the event, and to use a handler to place the device under test in a quiescent state and to instruct the device under test to transmit data of one or more registers. The second debug port may receive the data of the one or more registers from observation signal lines of the device under test.

19 Claims, 4 Drawing Sheets

DEBUG PORT SYSTEM FOR CONTROL AND OBSERVATION

BACKGROUND

Testing systems are used to determine whether a processing device (e.g., a microprocessor) is operating properly. Testing systems may be used during development of a processing device and/or to test batches of processing devices during a post-manufacturing procedure. Many types of testing systems have been employed.

The In-Target Probe (ITP) run-time control tool provides examination and manipulation of an architectural state, system memory access, software debugging, chipset resource access, as well as root-cause platform routing and signal integrity evaluations. The ITP tool suite may provide such analysis by attempting to manually correlate a logic state either from a post-failure analysis of stored data from internal registers, memories and Joint Test Access Group (JTAG) scan elements, or by inferring from an execution state as observed from a front-side address, data and control bus. The foregoing approach often does not provide suitable and/or efficient observation of events within the processing device, particularly within the debug time span.

A logic analyzer may be coupled to the ITP tool in order to improve the quality of an integrated hardware and software test. In particular, the logic analyzer may present all data that is transmitted over the front-side bus during operation of the processing device. Such an approach is prohibitively expensive for almost all envisioned usage scenarios. Moreover, this approach is often unsuitably inefficient due to the large ratio of presented data to relevant data.

DETAILED DESCRIPTION

Figure 1:
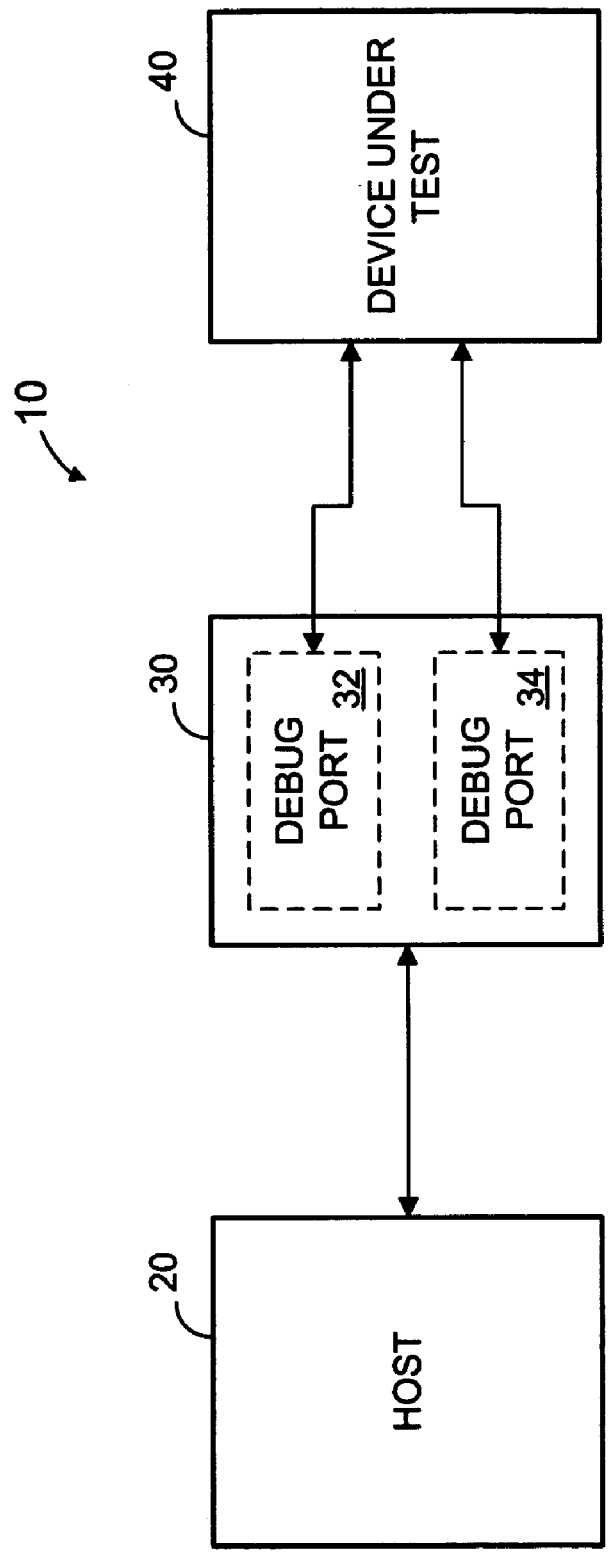
FIG. 1 is a diagram of a system according to some embodiments.

FIG. 1 is a block diagram of system 10 according to some embodiments. System 10 includes host 20, debug tool 30 and device under test 40.

Host 20 may comprise any combination of hardware and/or software elements, including elements located remotely from one another. According to some embodiments, host 20 comprises a desktop computer based on a Pentium®-class microprocessor. Host 20 may therefore execute processor-executable process steps to perform actions attributed thereto.

Host 20 is in communication with debug tool 30. As described with respect to host 20, debug tool 30 may comprise any combination of remote and/or local hardware and/or software elements. In this regard, debug tool 30 comprises debug port 32 and debug port 34. Debug port 32 and debug port 34 may share one or more hardware or software elements or may comprise entirely separate systems. Debug ports 32 and 34 may be housed in a same or in separate physical units. Although FIG. 1 illustrates a single link between host 20 and debug tool 30, one or more signal paths of the link may be dedicated to one of debug port 32 and/or debug port 34.

Each of debug ports 32 and 34 may comply with one or more design specifications associated with an ITP tool. Debug ports 32 and 34, as well as system 10 in general, may also comprise features different from and/or in addition to those specified in the aforementioned design specifications.

Debug ports 32 and 34 are in communication with device under test 40. Device under test 40 may comprise one or more processing devices, including but not limited to Central Processing Units, and processor cores. Device under test 40 may also include functional blocks such as a cache structure and an Arithmetic Logic Unit. According to some embodiments, device under test 40 includes registers for storing data that may be of particular use during testing (e.g., instruction-based registers).

Device under test 40 may include any number of features for facilitating testing thereof. For example, device 40 may include JTAG scan chains that may be controlled by debug ports 32 or 24 to shift data in and out of internal processing nodes of device 40. Device 40 may also provide event monitoring logic and registers for implementing such event monitoring.

As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 2:
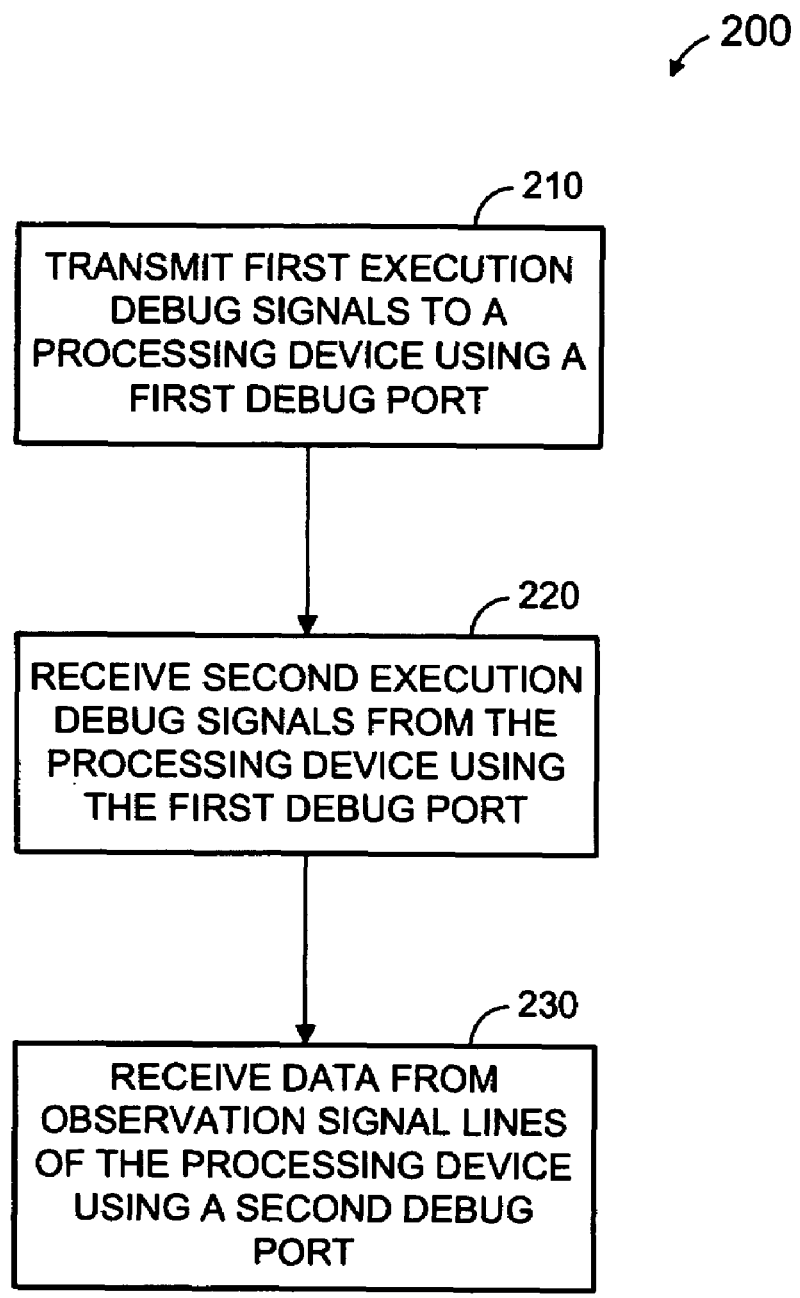
FIG. 2 is a flow diagram of a method according to some embodiments.

FIG. 2 is a general flow diagram of method 200 that may be performed by system 10 according to some embodiments. Method 200 may therefore be performed by any combination of hardware and/or software existing in any element of system 10. Some embodiments of method 200 may be practiced in any order that is practicable.

First execution debug signals are initially transmitted at 210 to a processing device using a first debug port. According to some examples of 210, debug port 32 transmits event monitoring signals to device 40 in order to configure device 40 to monitor an event. Such an event may comprise any event that device 40 is capable of monitoring, and may specify a number of times the event is to occur (i.e., a count) before debug tool 30 is notified. The event monitoring signals may comprise breakpoint monitoring (BPM) signals. A more detailed example of event monitoring according to some embodiments will be provided below.

Next, at 220, second execution debug signals are received from the processing device using the first debug port. Continuing with the above example, debug port 32 may receive execution debug signals from device 40 indicating the occurrence of the monitored event. According to some embodiments, the received execution debug signals are BPM signals whose functionality is supported by device under test 40.

Data is then received by a second debug port from observation signal lines of the processing device at 230. The received data may be associated with the monitored event. According to some embodiments, debug port 34 receives the data from observation signal lines of device under test 40. The observation signal lines may comprise BPM signal lines that transmit the data to debug port 34. Although the observation signal lines between device 40 and debug port 34 are illustrated as independent from signal lines between device 40 and debug port 32, one or more signal lines of device 40 may be shared between debug port 32 and debug port 34.

In some embodiments, host 20 evaluates the received data to verify proper functioning of device 40.

Figure 3:
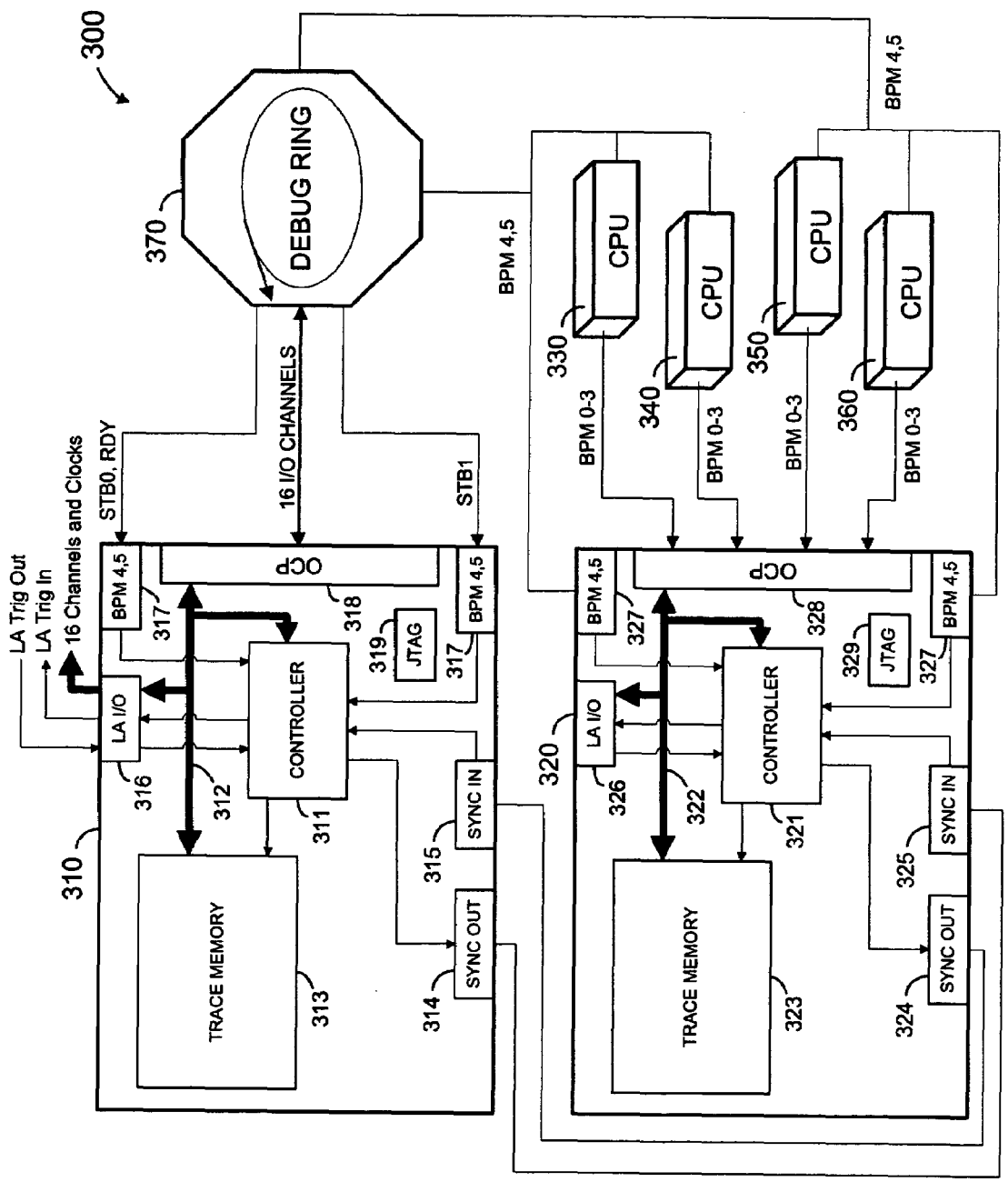
FIG. 3 is a block diagram of a system according to some embodiments.

FIG. 3 is a block diagram illustrating the internal architecture of various elements of system 300 according to some embodiments. System 300 comprises debug port 310, debug port 320, Central Processing Units (CPUs) 330 through 360, and debug ring 370. System 300 may perform process 200 according to some embodiments.

Debug port 310 may comprise any combination of hardware and/or software suitable to perform the functions described herein. Debug port 310 comprises a Field-Programmable Gate Array (FPGA) according to some embodiments. Such an FPGA may be supported with appropriate hardware and software interfaces to elements that are connected thereto.

Debug port 310 includes controller 311 to execute program code for controlling other elements of debug port 310. For example, controller 311 may receive data from bus 312 and may control the transfer of the data to trace memory 313. Trace memory may also store the aforementioned program code. Controller 311 may control timing interfaces 314 and 315 to provide interoperation with debug port 320 as will be described below.

Logic Analyzer interface 316 may also receive the data from bus 312 and output the data to a logic analyzer (not shown) under control of controller 311. As mentioned above, use of a logic analyzer for hardware testing can be expensive and quite inefficient due to the large ratio of presented data to relevant data. In some embodiments, data from bus 312 is also received by a host such as host 20.

Controller 311 may receive timing signals from elements 317. Elements 317 are labeled BPM 4,5 because the timing signals received thereby correspond to breakpoint monitoring signals issued by one or more of CPUs 330 through 360. The breakpoint monitoring signals in turn correspond to front-side bus data received by Observation and Control Port (OCP) 318.

JTAG handler 319 provides debug port 310 with known JTAG functionality. In some embodiments, debug port 310 may execute JTAG handler 319 to stop processor execution, to query processor logic, and to issue an instruction. Some embodiments provide one or more additional or alternative serial protocol ports including but not limited to an Inter-Integrated Circuit (I²C) port and a proprietary serial port.

The front-side bus data comprises 16 I/O channels and is received from debug ring 370. Debug ring 370 comprises a 72-bit configurable state machine according to some embodiments. Debug ring 370 may comprise an Intel Northbridge™ chip for supporting front-side bus communication. Some embodiments of system 300 may utilize an entirely different element for debug ring 370, and/or may eliminate debug ring 370 altogether.

Debug ring 370 is coupled to respective front-side busses and breakpoint monitoring signals of CPUs 330 through 360. In this regard, CPUs 330 through 360 may support internal signaling mechanisms that may be used to collect the occurrence of selected event monitor detection outputs. These mechanisms may target the internal state of a CPU and report it in a deterministic fashion for trace.

According to some embodiments, CPUs 330 through 360 support Model Specific Registers (MSRs) that include performance monitoring registers. These latter registers may include a time stamp counter register, a control and event select register, and two programmable event counters. Some Intel Pentium™ processors are capable of monitoring 38 different events in each performance monitoring register. Some events are counted per occurrence, and counts for others are incremented for each clock cycle during which a particular condition is true.

Observation signal lines of CPUs 330 through 360 are coupled to debug port 320. In the illustrated embodiment, the observation signal lines comprise BPM signal lines. Debug port 320 may thereby receive data from CPUs 330 through 360 that relate to monitored events. For example, debug port 320 may receive data from instruction-based registers of CPU 330 in response to a detected event of CPU 330.

The observation signal lines are coupled to OCP 328 of debug port 320. Accordingly, bus 322 may carry the received data to Logic Analyzer I/O 326 and to trace memory 323. Such data may also be transmitted from port 320 to a host (not shown). Elements 327 of debug port 320 are also coupled to BPM signals of CPUs 330 through 360 in order to control the execution state thereof. Other elements of debug port 320 function similarly as described above with respect to similarly-numbered elements of debug port 310.

Figure 4:
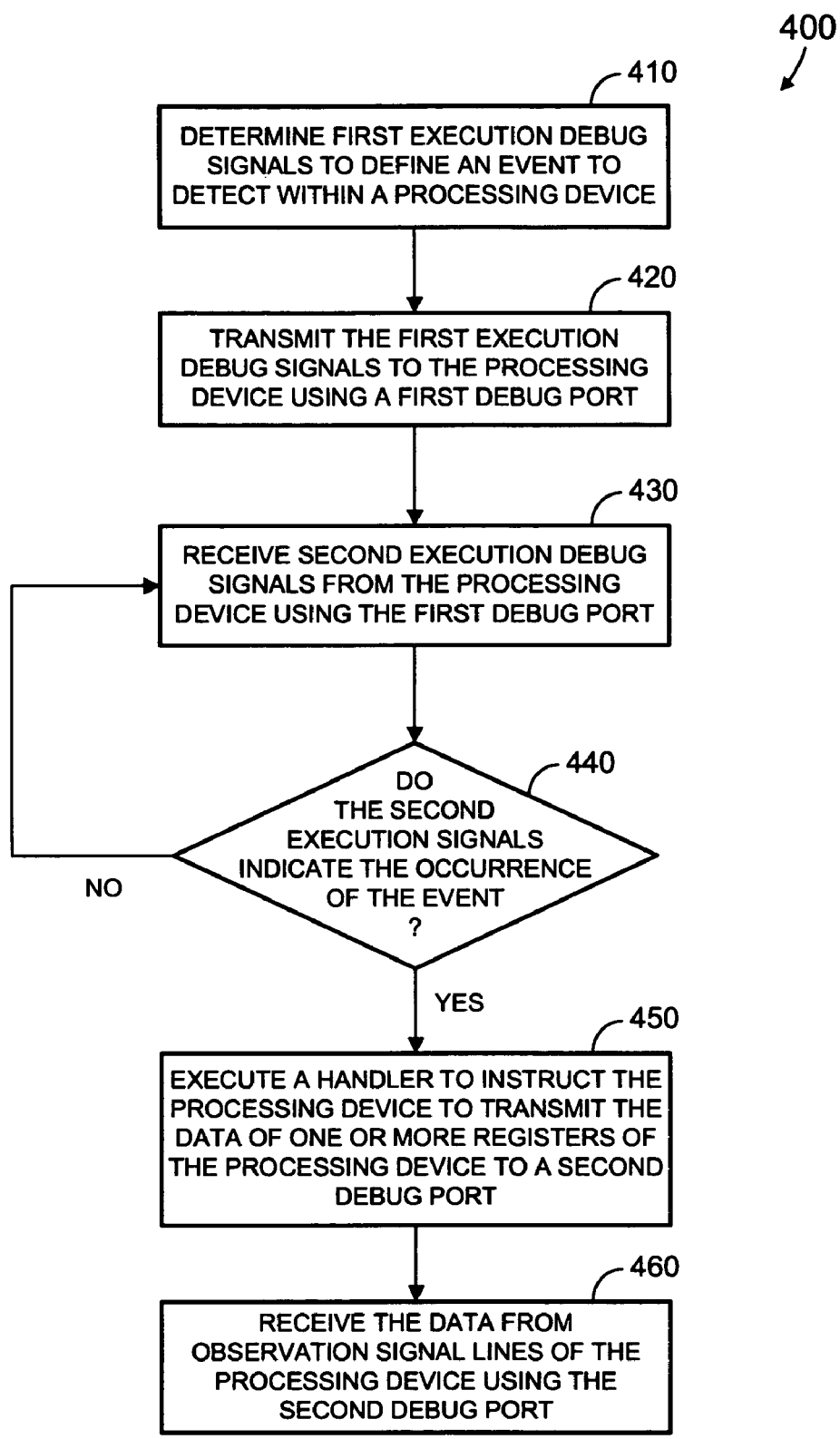
FIG. 4 is a flow diagram of a method according to some embodiments.

FIG. 4 is a flow diagram of process 400 according to some embodiments. Process 400 may be executed by system 300. Process 400 may be executed by any configuration of hardware and/or software that is or becomes known. According to some embodiments, process 400 is executed jointly by controller 311 and by controller 319 of system 300.

First execution debug signals are initially determined at step 410. The first execution debug signals are to define an event to detect within a processing device. According to the FIG. 3 embodiment, the execution debug signals comprise BPM signals that may be transmitted to one or more of CPUs 330 through 360 to define an event using performance monitoring registers thereof. A host such as host 20 may determine the first execution debug signals according to some embodiments.

Next, at 420, the first execution debug signals are transmitted to the processing device using a first debug port. Transmitting the first execution debug signals may comprise setting values of the aforementioned MSRs of the one or more of CPUs 330 through 360. As illustrated in FIG. 3, transmitting the first execution debug signals may also or alternatively comprise configuring a debug ring to monitor the one or more of CPUs 330 through 360 for occurrence of the event. According to some embodiments, transmitting the first execution debug signals may comprise one or more of forcing control sequence actions in processing device, causing an execution change in the processing device, and directly modifying code running in the processing device.

Second execution debug signals are received from the processing device using the first debug port at step 430. The second execution debug signals may be received from the processing device via a debug ring. The second execution debug signals may indicate that the defined event has occurred. Accordingly, the second execution debug signals may comprise a response to an instruction to read an MSR that is received by the processing device.

At 440, it is determined whether the second execution debug signals indicate the occurrence of the event. If not, flow returns to 430 to await additional second execution debug signals. According to some embodiments, the event of interest is a sequence of two writes to the configuration space registers. Debug port 310 therefore configures debug ring 370 at 420 to monitor for a write to configuration space registers. Debug port 310 receives second execution debug signals at 430 indicating such a write. Debug port 310 determines at 440 that the event (i.e., two writes) has not occurred, and flow therefore returns to 430. Flow proceeds from 440 to 450 after second execution debug signals are received that indicate a second write to the configuration space registers.

A hander is executed (invoked) at 450. The handler is to instruct the processing device to transmit the data of one or more registers of the processing device to a second debug port. In some embodiments of 450, the handler also places the processing device in a quiescent state. The handler may comprise a serial protocol bus (e.g., a JTAG bus) to access internal state and operational resources of the processing device, to observe a state of the resources, and to collect retained data values. Continuing with the foregoing example, debug port 310 may invoke JTAG handler 319 in 450 to cause a quiescent break in the processing device and to instruct the processing device to report out its instruction-based registers.

The data is received from observational signal lines of the processing device using the second debug port. In the FIG. 3 embodiment, debug port 320 may control reception of the data using elements 327. The data may be transferred to trace memory 323 via bus 322. According to some embodiments, flow may return from 460 to 430 to detect a second occurrence of the event. In this regard, system 300 may synchronize reception of the instruction-based register data to the "double write" event.

The several embodiments described herein are solely for the purpose of illustration. Persons in the art will recognize from this description that other embodiments may be practiced with modifications and alterations limited only by the claims.

What is claimed is:

1. A method comprising:
    transmitting first execution debug signals to a processing device using a first debug port;
    receiving second execution debug signals from the processing device using the first debug port; and
    receiving data from observation signal lines of the processing device using a second debug port, wherein the first execution debug signals define an event to detect within the processing device,
    wherein the second execution debug signals indicate the occurrence of the event, and further comprising:
    invoking a handler of the first debug port to place the processing device in a quiescent state and to instruct the processing device to transmit the data of one or more registers to the second debug port.

2. A method according to claim 1, wherein transmitting the first execution debug signals to the processing device comprises forcing control sequence actions in the processing device.

3. A method according to claim 1, wherein transmitting the first execution debug signals to the processing device comprises causing an execution change in the processing device.

4. A method according to claim 1, wherein transmitting the first execution debug signals to the processing device comprises directly modifying code running in the processing device.

5. A method according to claim 1, further comprising using the first debug port to execute a serial protocol bus to access internal state and operational resources of the processing device, to observe a state of the resources, and to collect retained data values.

6. A method according to claim 1, wherein transmitting the first execution debug signals to the processing device comprises setting values of model specific registers of the processing device.

7. A method according to claim 1, wherein the second execution debug signals indicate the occurrence of events in the processing device.

8. A method according to claim 1, wherein transmitting first execution debug signals to a processing device using the first debug port comprises transmitting the first execution debug signals to a debug ring coupled to the processing device and to one or more other processing devices, and
    wherein receiving the second execution debug signals from the processing device using the first debug port comprises receiving the second execution debug signals from the debug ring.

9. An apparatus comprising:
    a first debug port to receive and transmit execution debug signals from and to a processing device; and
    a second debug port to receive data from observation signal lines of the processing device, wherein the first debug port is to transmit execution debug signals to define an event to detect within the processing device, to receive execution debug signals indicating occurrence of the event, and to use a handler to place the processing device in a quiescent state and to instruct the processing device to transmit data of one or more registers, and
    wherein the second debug port is to receive the data of the one or more registers from observation signal lines of the processing device.

10. An apparatus according to claim 9, wherein the first debug port is to force control sequence actions in the processing device.

11. An apparatus according to claim 9, wherein the first debug port is to cause an execution change in the processing device.

12. An apparatus according to claim 9, wherein the first debug port is to directly modify code running in the processing device.

13. An apparatus according to claim 9, wherein the first debug port supports a serial protocol bus to access internal state and operational resources of the processing device, to observe a state of the resources, and to collect retained data values.

14. An apparatus according to claim 13, wherein the serial protocol bus comprises a Joint Test Access Group bus.

15. An apparatus according to claim 9, wherein the first debug port transmits execution debug signals to set values of model specific registers of the processing device.

16. An apparatus according to claim 9, wherein the first debug port receives execution debug signals to detect events occurring in the processing device.

17. An apparatus according to claim 9, further comprising:
    a debug ring coupled to first debug port, to execution debug signals of the processing device and to execution debug signals of one or more other processing devices.

18. A system comprising:
    a device under test comprising a processing core to support execution debug signals;
    a debug ring to receive and to transmit the execution debug signals from and to the device under test;
    a first debug port to receive and transmit the execution debug signals from and to the debug ring; and
    a second debug port to receive data from observation signal lines of the device under test, wherein the first debug port is to transmit execution debug signals to define an event to detect within the device under test, to receive execution debug signals indicating occurrence of the event, and to use a handler to place the device under test in a quiescent state and to instruct the device under test to transmit data of one or more registers, and
    wherein the second debug port is to receive the data of the one or more registers from observation signal lines of the device under test.

19. A system according to claim 18, wherein the handler comprises a Joint Test Access Group handler.

* * * * *